(12) United States Patent
Winter

(10) Patent No.: US 11,311,832 B2
(45) Date of Patent: Apr. 26, 2022

(54) SEPARATING PARTICLES FROM A PROCESSING GAS STREAM

(71) Applicant: NETZSCH Trockenmahltechnik GmbH, Hanau (DE)

(72) Inventor: Frank Winter, Mühlheim (DE)

(73) Assignee: NETZSCH Trockenmahltechnik GmbH, Hanau (DE)

( * ) Notice: Subject to any disclaimer, the term of this patent is extended or adjusted under 35 U.S.C. 154(b) by 0 days.

(21) Appl. No.: 16/912,074

(22) Filed: Jun. 25, 2020

(65) Prior Publication Data

US 2021/0039035 A1    Feb. 11, 2021

(30) Foreign Application Priority Data

Aug. 7, 2019    (DE) .................... 102019121373.8

(51) Int. Cl.
| | | |
|---|---|---|
| *B01D 53/00* | (2006.01) | |
| *B01D 50/20* | (2022.01) | |
| *B01D 45/08* | (2006.01) | |
| *B01D 45/16* | (2006.01) | |
| *B01D 46/00* | (2022.01) | |
| *B01D 46/02* | (2006.01) | |

(Continued)

(52) U.S. Cl.
CPC ............ *B01D 50/20* (2022.01); *B01D 45/08* (2013.01); *B01D 45/16* (2013.01); *B01D 46/0049* (2013.01); *B01D 46/02* (2013.01); *B01D 46/71* (2022.01); *B02C 23/24* (2013.01); *B01D 2273/30* (2013.01)

(58) Field of Classification Search
CPC ...... B01D 50/002; B01D 45/08; B01D 45/16; B01D 46/0049; B01D 46/0068; B01D 46/02; B01D 2273/30; B01D 46/0067; B01D 45/18; B01D 46/2407; B01D 45/12; B02C 23/24; B02C 23/08; B04C 5/22; B04C 5/13; B04C 2009/004; B04C 5/081

See application file for complete search history.

(56) References Cited

U.S. PATENT DOCUMENTS

| | | | |
|---|---|---|---|
| 2,372,514 A | * 3/1945 | Pootjes | ...................... B04C 5/24 |
| | | | 55/343 |
| 2,756,878 A | * 7/1956 | Herkenhoff | ............... B04C 5/13 |
| | | | 209/732 |

(Continued)

FOREIGN PATENT DOCUMENTS

| | | |
|---|---|---|
| DE | 19914674 C1 | 12/2000 |
| DE | 60319017 T2 | 1/2009 |
| DE | 102004039182 B4 | 7/2010 |

*Primary Examiner* — Dung H Bui
(74) *Attorney, Agent, or Firm* — Whitmyer IP Group LLC

(57) ABSTRACT

A separator for separating solid particles from a processing gas stream that has been fed repeatedly through a work machine, wherein the separator includes a processing gas inlet through which particle-laden processing gas emitted from the work machine is fed into the separator, and a filterless separator element to reduce the particle content of the processing gas and a processing gas outlet to discharge the processing gas with its reduced particle content to the work machine, the separator including a secondary stream filter, which filters a smaller portion of the processing gas, and a secondary outlet, connected thereto, which ejects the filtered secondary stream of processing gas.

16 Claims, 2 Drawing Sheets

(51) Int. Cl.
  *B02C 23/24* (2006.01)
  *B01D 46/71* (2022.01)

(56) References Cited

U.S. PATENT DOCUMENTS

| | | | | | |
|---|---|---|---|---|---|
| 2,788,087 | A | * | 4/1957 | Lenehan | B04C 5/10 55/338 |
| 2,909,133 | A | * | 10/1959 | Gordon | B04C 5/13 110/104 R |
| RE26,720 | E | * | 11/1969 | Visman | B04C 5/00 209/726 |
| 4,172,710 | A | * | 10/1979 | van der Molen | A47L 9/1666 55/340 |
| 4,278,452 | A | * | 7/1981 | Ido | B04C 5/13 55/339 |
| 4,353,722 | A | * | 10/1982 | Berz | B01D 46/0058 55/294 |
| 4,452,617 | A | * | 6/1984 | O'Dell | B01D 46/02 251/228 |
| 4,695,299 | A | * | 9/1987 | Spadaro | B01D 46/12 55/315 |
| 5,478,484 | A | * | 12/1995 | Michaluk | B01D 29/114 210/788 |
| 5,762,783 | A | * | 6/1998 | Harvey | B01D 29/114 210/108 |
| 6,190,543 | B1 | * | 2/2001 | Christiansen | B04C 5/13 210/87 |
| 6,238,579 | B1 | * | 5/2001 | Paxton | B01D 21/2411 210/787 |
| 6,435,431 | B1 | * | 8/2002 | Chapman, Jr | B02C 23/08 241/19 |
| 6,461,499 | B1 | * | 10/2002 | Bosman | B04C 5/13 209/715 |
| 8,979,958 | B2 | * | 3/2015 | da Silva | B01D 46/2411 55/315 |
| 10,695,775 | B1 | * | 6/2020 | Hedrick | B04C 5/103 |
| 2004/0055470 | A1 | * | 3/2004 | Strauser | E01H 1/0827 96/417 |
| 2004/0187449 | A1 | * | 9/2004 | Witter | B04C 9/00 55/337 |
| 2005/0178097 | A1 | * | 8/2005 | Clements | B01D 46/521 55/378 |
| 2006/0080947 | A1 | * | 4/2006 | Lee | A47L 9/1691 55/426 |
| 2006/0236663 | A1 | * | 10/2006 | Oh | A47L 9/1608 55/337 |
| 2007/0039900 | A1 | * | 2/2007 | Levitt | B01D 29/908 210/787 |
| 2008/0250765 | A1 | * | 10/2008 | Lane | B01D 45/06 55/495 |
| 2009/0178567 | A1 | * | 7/2009 | Han | A47L 9/1641 96/381 |
| 2009/0212140 | A1 | * | 8/2009 | Ritzenthaler | C01D 7/22 241/17 |
| 2010/0089014 | A1 | * | 4/2010 | Zhou | A47L 9/165 55/322 |
| 2012/0010063 | A1 | * | 1/2012 | Levitt | B01D 17/0217 494/27 |
| 2012/0151710 | A1 | * | 6/2012 | Yarbrough | B01D 46/0068 15/347 |
| 2012/0167336 | A1 | * | 7/2012 | Tran | A47L 9/122 15/347 |
| 2013/0125799 | A1 | * | 5/2013 | Fried | C04B 28/02 110/342 |
| 2013/0199137 | A1 | * | 8/2013 | Hallgren | B01D 46/48 55/393 |
| 2014/0345497 | A1 | * | 11/2014 | Dumont | B02C 23/08 106/772 |
| 2015/0203928 | A1 | * | 7/2015 | Thome | B02C 23/08 241/23 |
| 2015/0204477 | A1 | * | 7/2015 | Menzel | C04B 20/026 252/62 |
| 2015/0375235 | A1 | * | 12/2015 | Roitto | B02C 17/186 241/15 |
| 2016/0045922 | A1 | * | 2/2016 | Umar | B04C 5/12 55/346 |
| 2019/0009282 | A1 | * | 1/2019 | Damkjr | B04C 5/04 |
| 2019/0150683 | A1 | * | 5/2019 | Valentini | B01D 46/442 |
| 2019/0217519 | A1 | * | 7/2019 | Zhai | B02C 23/18 |
| 2019/0321833 | A1 | * | 10/2019 | Lu | B04C 3/04 |
| 2020/0376497 | A1 | * | 12/2020 | Lind | B02C 21/007 |

* cited by examiner

SEPARATING PARTICLES FROM A PROCESSING GAS STREAM

TECHNICAL FIELD

Certain mills or crushing machines (hereinafter referred to broadly as "mills") require for their operation great quantities of processing gas, which is also known as milling gas. In can frequently occur, for example, that the initially large particles intensively collide with one another and/or with impact agents or baffles in the mill because of the corresponding propulsion of the processing gas. As a result, the particles are made to crumble with such frequency that the desired fineness is finally achieved.

BACKGROUND

In some cases, installations of this kind employ a blow-through process, so that the carrier gas or processing gas is discarded as soon as it has emerged from the mill or crushing machine. At that point the carrier gas or processing gas must be completely cleansed of its particle content, thoroughly enough so that the gas can be released into the environment.

In other cases, such as when it is important to maintain an inert atmosphere, such installations employ a circulating gas process. Even in such installations, the carrier gas or processing gas must regularly undergo a particle separation process.

Most mills of this type typically rely on the additional insufflation of back-flushing gas. After its inevitable release from the area to be flushed, back-flushing gas combines with the carrier gas and jointly forms with it the so-called processing gas and they are expelled together. The back-flushing gas typically serves, in certain areas of the mill, to keep the particle load as low as possible and even to deploy a blocking effect. For example, in such machines that utilize sliding contact bearings or roller bearings, which are subject to particle build-up, high-pressured back-flushing gas is insufflated into the processing gas in order to prevent or at least reduce particles' access to the bearing gap or to the roller elements and their tracks. In addition, back-flushing gas can be utilized, for example on rotary feeders or to block contact-free insulations, such as with labyrinth gap seals or the like. Finally, back-flushing gas is sometimes used as a discharge aid for sluices, funnels or the like.

It has become common by now, particularly in installations employed in network operation, that processing gas coming from the mill and at first depleted because of its high particle content, can be freed from a good portion of its particles by means of a cyclone separator. Subsequently, the portion consisting of especially fine particles, which to this point still remains in the processing gas, is eliminated or decisively reduced by a filtering device. Then a part of the processing gas is blown off, that is, released to the environment. The remaining processing gas is recirculated, that is, fed back into the mill.

SUMMARY

The invention is based on the problem that filters must regularly be subjected to maintenance, that is, cleaned of dust or even replaced. The reason is that typical mills work with processing gas streams of several 100 to 10,000 m³/h and also, on completing a diligent filterless separation, as a general rule, residues of dust contents of 1 mg/cubic meter to 20 mg/cubic meter are present. For this reason, the filters involved here are confronted at least with residual dust loads of several kilograms per hour. The applied filters become clogged with corresponding speed.

To extend the maintenance intervals in such a way that they bridge tolerable periods during long-term operation, correspondingly large filters are applied.

Consequently, the object of the invention is to provide a possibility of managing with smaller filters or of being able to definitely lengthen the maintenance intervals of existing filters.

The Solution Provided by the Invention

The task confronted by the invention is fulfilled on the basis of the characteristics of the principal claim.

Accordingly, the invention proposes a separator for separating solid particles from a processing gas stream that has been fed multiple times through a work machine, said separator comprising a processing gas inlet, through which particle-laden processing gas emitted from the work machine is fed into the separator. The separator further includes a filterless separator element for reducing the particle content of the processing gas. In addition, the separator includes a processing gas outlet for emitting processing gas, now bearing reduced particle content, into the work machine.

The inventive separator is distinguished in that it comprises a secondary-stream filter which filters only a rather small portion of the processing gas, and a secondary outlet connected thereto, which discharges the filtered secondary stream of processing gas. The secondary stream corresponds, as a rule (completely or at least substantially), to the back-flushing stream.

A processing gas stream repeatedly fed through a work machine, in the terms of the invention, is understood to mean a processing gas stream which at some point, regardless of the fact that it may repeatedly circulate inside the work machine, is temporarily discharged from the work machine, in order to be treated and thereafter to be fed back into the work machine. Naturally, in the process, complete expulsion from the work machine is not required. Instead, the inventive separator could also be an integral component of the work machine, so that the processing gas flow is only conveyed out of and back into the working area of the work machine. In most cases the inventive separator is an independent device, which is situated alongside the mill or crushing machine and is connected thereto with tubing.

The particle content of the processing gas typically consists of particles with a center diameter between 5 mm and 0.2 μm. The separator is structurally sized to deal with such particle dimensions. The aforementioned smaller portion of the processing gas is a part amounting to 10% or less of the processing gas flowing through the separator, and as a rule even less than 3% of the processing gas flowing through the separator. Typically, this smaller portion corresponds completely or at least substantially to the quantity of the flushing gas which is fed to the work machine and which combines with the processing gas in the work machine.

A filterless separator element is a separator element that removes particles from a gas stream by other means than by physically retaining the particles through contact of such particles with physical elements of a gas-permeable particle retention medium. A likely example would be separation by means of cyclone effect or possibly also electrostatic separation.

The invention applies the recognition that loading processing gas with very fine particles is insignificant as long as the processing gas is fed back into the work machine. On this basis, the invention proposes to use filtering to free merely a portion of the processing gas even from very fine particles, namely that portion which is diverted from the circuit and for this purpose must be emitted in any form to the outside.

In this manner it is possible, without inordinate expense, to provide a filter that, in proportion to the mass of the secondary stream fed through it, comprises a decidedly large filtering surface such as cannot be achieved as a rule in well-known solutions. Consequently, maintenance intervals for the filter are significantly extended because the filter, which is now impacted only to a lesser extent than before, does not become clogged until significantly later. Another advantage is that substantially smaller filters are also sufficient because of the clearly reduced gas quantities requiring filtering.

Optional Possibilities for a Preferred Refinement of the Invention

As a rule, a filterless separator element is disposed upstream from the secondary stream filter. The free switching occurs in such a way that the secondary stream filter is fed exclusively, or in any case primarily, with processing gas less loaded with particles—in comparison with the particle content which the processing gas comprises on its entry into the separator.

Ideally, the separator element comprises a cyclone separator. This can mean in simple cases that the separator element consists only of a cyclone separator or in some cases several cyclone separators mounted one behind the other. Cyclone separators are maintenance-free and able to separate high quantities of particles from the processing gas stream.

It is especially advantageous if the separator organ comprises a deflecting baffle which connects upstream to the cyclone separator and which achieves a second separation stage. A deflecting baffle is understood to mean not simply every stream deflection device, but in any case each one that compels at least the overwhelming portion of the stream circulating previously in the cyclone separator to leave its previous course and to modify its streaming direction by at least 120-360° from the former streaming direction, as a rule to a pathway diameter that is smaller than the smallest diameter of the cyclone.

Ideally the deflecting baffle takes the form of a tube with an inlet opening on the front end and thus turned away from the cyclone stream. The immersion tube, serving at its one end as a deflecting baffle, is basically in a centered or coaxial position in the eye or near the eye of the cyclone stream. This allows a particularly compact structure. The cyclone stream can circle about the immersion tube and uses the otherwise not usable area of the cyclone's eye by separating this area from the rest of the cyclone. As a result of this separation, other functional elements can be located in the cyclone's eye without any disturbance, such as the filter responsible for the secondary stream.

As a rule, the immersion tube runs through the cyclone stream completely—in that the processing gas inlet, from which the cyclone stream begins, is situated below the upper end of the immersion tube and in that the immersion tube is configured in such a way that the cyclone stream comes to an end essentially at the underside entrance into the immersion tube.

Choice goes preferably to a structural configuration in which the immersion tube is provided on its lower front end with an entrance opening. Thereby the immersion tube as a rule is so configured that it conducts a stream that rises along its longitudinal axis in its interior. The separator, in turn, is configured in such a way that the cyclone stream forms a falling stream between the processing gas inlet and the lower front end of the rising tube. The elimination of particles is substantially improved thanks to the stream falling only along the outer sheath surface of the immersion tube and the ensuing (abrupt) bending of the stream into the interior of the immersion tube as a stream that rises there once again. This occurs because the aforementioned "bending" overexerts a good portion of the particles previously still remaining in the stream. They continue the movement, which was earlier forced on them by inertia, for another moment longer than the gas stream does. They are thereby removed from it, being, so to speak, "thrown for a loop." The area in which the cyclone stream, falling on the outside of the immersion tube, bends inward into the immersion tube and starts to rise again there, thus forms a second elimination stage, which follows the first elimination stage in the figure of the cyclone.

Another Inventive Solution

Another inventive solution, for which protection is claimed both in its own right and also in connection with the claims already established, is as follows.

The separator, in any case, is configured according to the generic terms of the first principal claim. It comprises an immersion pipe. The immersion pipe is characterized in that, at the point where it forms the deflection baffle, it is configured in several parts. This configuration is selected in such a way that its entry opening is configured by an immersion-tube end piece that can be removed from the rest of the tube. It can be exchanged for at least one other one, preferably an immersion-tube end piece that constitutes an additional component of the separator. This other immersion-tube end piece forms an entry opening with a different diameter. Ideally, the immersion-tube end piece, which is then secured with a bayonet lock, other type of rapid lock and/or milled nut or wing nut, can be connected and removed without the need for tools.

Other Optional Configurations for a Preferred Refinement of the Invention

Ideally, the immersion tube is configured as split into a first branch, which forms a processing gas outlet, and a second branch, which forms a secondary outlet. Thus the end of the first branch is preferably situated below the end of the second branch. This type of stream arrangement improves the possibilities of controlling the size of the stream volume which enters the second branch as a secondary stream.

Preferably, the immersion tube in its second branch contains a filter which is mounted upstream of the secondary outlet. Here the filter is preferably configured as a filter tube with a longitudinal axis that ideally extends vertically. Its sheath surface forms the actual filter material. It is penetrated from outside toward the inside by the secondary stream. Thus the secondary stream is preferably fed to the filter by way of a gap between the immersion tube and the filter tube. In this manner it is possible to provide a filter in an especially compact way, which comprises a sizeable filter surface in proportion to the absolute size of the secondary stream. In addition, this type of arrangement facilitates the cleaning of the filter by insufflation or pressure surges counter to the filter direction.

Ideally the separator—preferably behind the secondary outlet and integrated into the separator housing or in any case connected by tube with the separator—is equipped with a suction pump connected with it. The suction pump applies low pressure to the secondary outlet or the second branch. In this manner, the size of the secondary stream can be adjusted to the necessary level.

It is particularly favorable if the separator comprises a flushing device. This device can be configured in such a way that filter can be flushed counter to its filtering direction, preferably by means of pressure surges.

The installation can be constructed in particularly compact size if the immersion tube completely encloses the filter for the secondary outlet.

The filter placed downstream from the secondary outlet can be particularly well freed of dust if it is so arranged that particles which it removes by flushing are conveyed away through the immersion tube downward into the particle discharge area or if they can fall away without requiring additional particular steering action.

The climbing speeds in the tube around the filter should ideally be situated between 0.2-1.5 m/sec and preferably <1 m/sec in order to make it possible for the separated dust to fall away.

An especially effective configuration of the separation occurs if the cyclone sheath tube widens above the baffle and narrows again at the level of the baffle.

An Additional Inventive Solution

The invention, in addition, proposes a method for separating solid particles from a processing gas stream that emerges from a work machine and later essentially feeds back into it, said stream consisting of a carrier gas stream for transporting the material that is to be processed, combined with a flushing gas stream for flushing out particles from bearings or other sensitive areas. The inventive method is distinguished in that the processing gas stream is first subjected to a filterless—preferably variable-multi-stage—particle separation, such as first to separation by cyclone effect and then to separation by deflecting baffle. Then the processing gas stream is divided into a first part, which is redirected back to the work machine in unfiltered condition, and a second part, which is filtered and then discarded. Thus the second part of the processing gas stream corresponds—completely or at least substantially—to the flushing gas stream, which is newly redirected to the work machine.

The decisive advantage of this procedure is that it filters only the smaller part of the processing gas that truly requires filtering. The greater part of the processing gas is recycled into the mill in unfiltered condition, in recognition of the fact that fulfillment of its task in the mill is unaffected by the residual presence of fine particles. Therefore only basically smaller filter installations are required.

Other modes of functioning, possible configurations and advantages of the invention are provided for the specialist by the following description of a preferred embodiment supported by drawings.

BRIEF DESCRIPTION OF THE DRAWINGS

FIG. 3 shows a view according to FIG. 1, in which the streaming directions are symbolized by corresponding arrows.

FIG. 4 shows an alternative immersion-tube end piece 11 belonging to the separator with the separator in disassembled state.

DETAILED DESCRIPTION

Figure 1:
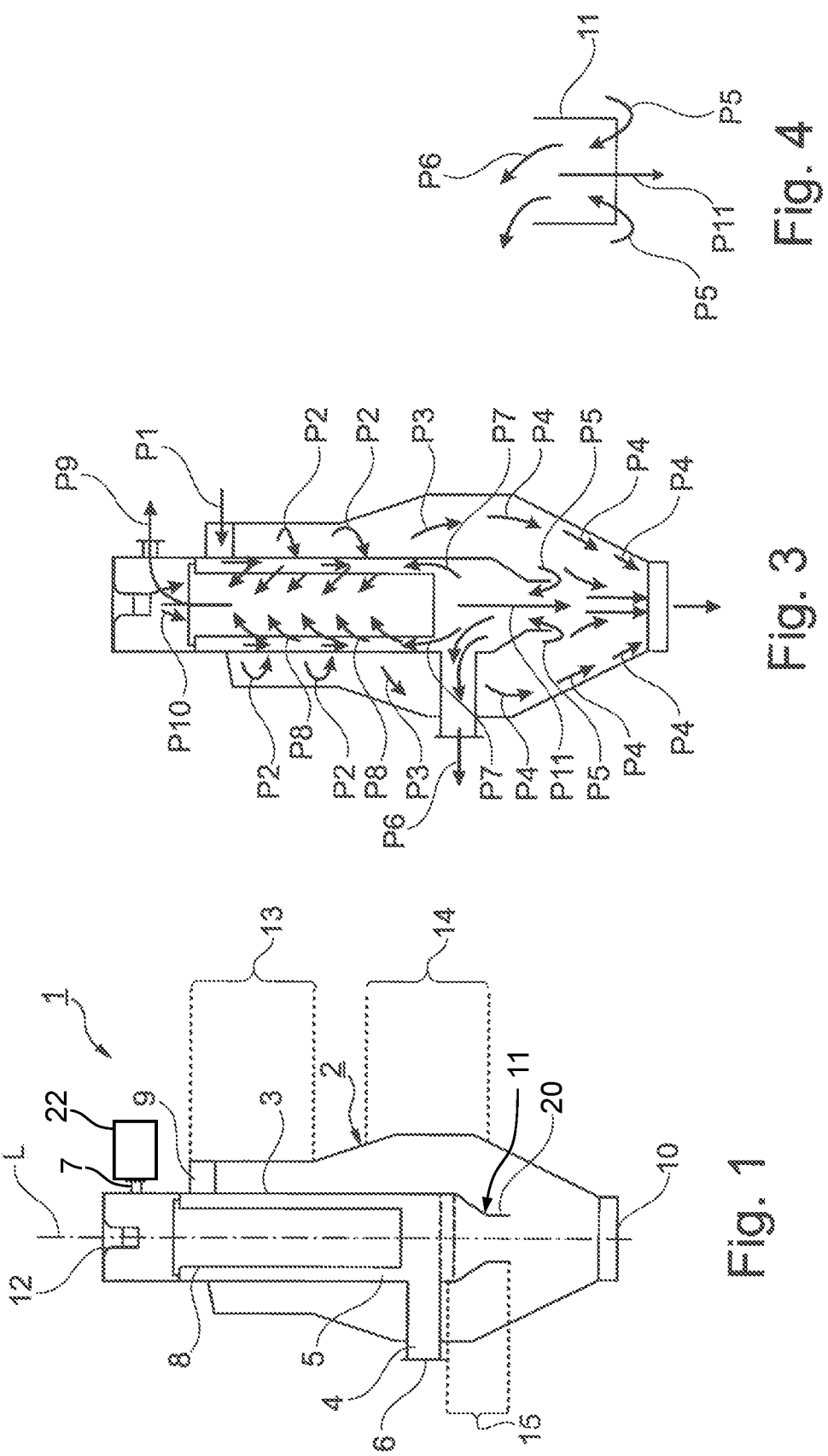
FIG. 1 shows an embodiment of an inventive separator in center longitudinal section.

FIG. 1 shows the preferred embodiment of the separator 1.

Figure 2:
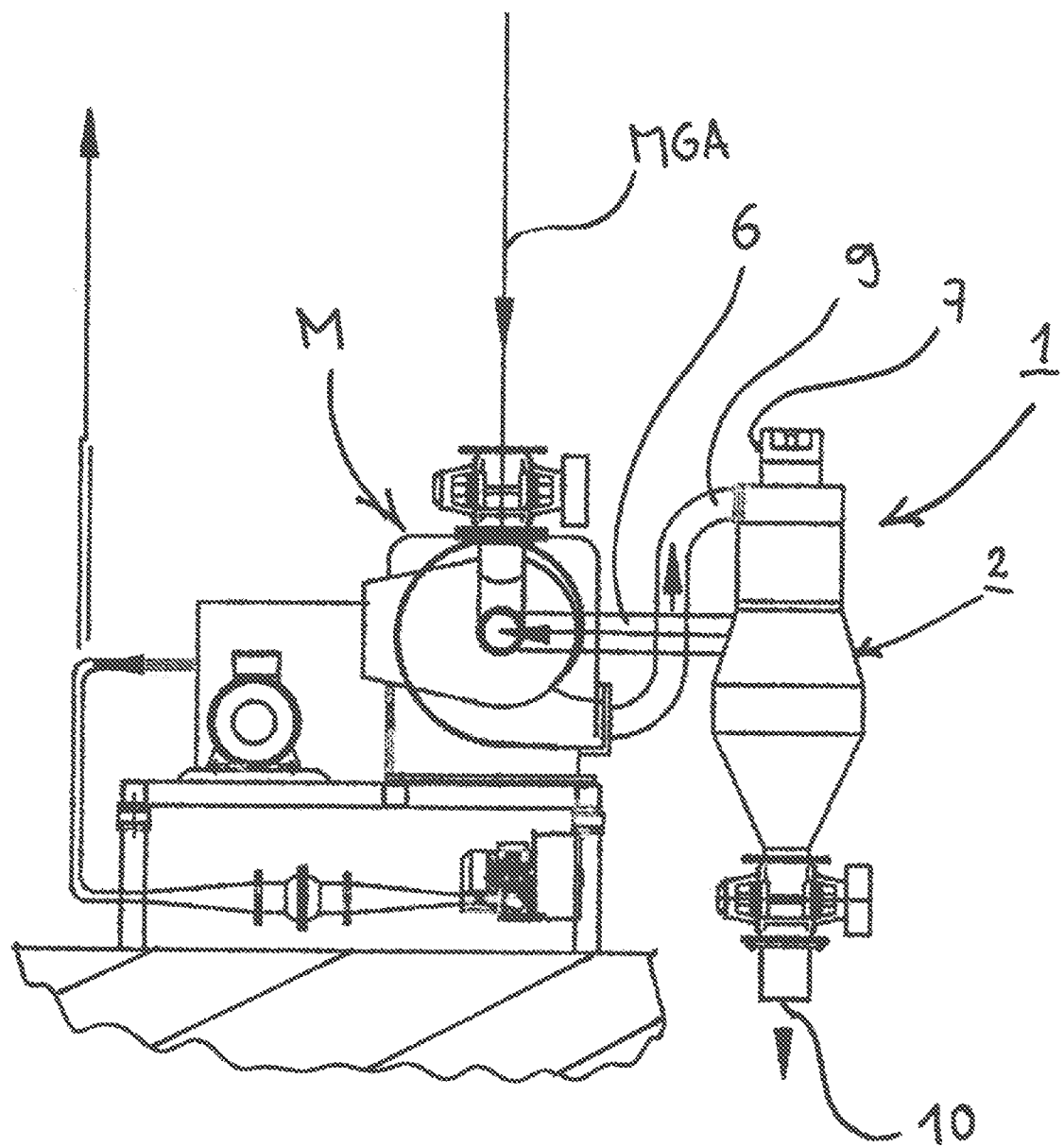
FIG. 2 shows the entire installation in which the inventive separator is constructed.

The separator 1 is realized here as an installation placed alongside the work machine, that is, a device that is situated, quasi freely or at least as independently as possible, beside the work machine that it is meant to serve—herein the figure of a mill M with a release of milled material MAG—and is connected by tubes with the machine; see also FIG. 2, illustrating this individual utilization.

The separator 1 consists of a housing 2, which as a rule constitutes the separation from the outside. The housing 2, integrally with the major portion of its enclosing surface, forms a cyclone sheath tube, which is described more fully below.

The processing gas inlet 9 is situated on the upper side of the housing 2. Processing gas, loaded with particles, is fed from the work machine, by way of the processing gas inlet 9, to the separator; said particles must be removed from it, at least essentially, in the next step.

On its underside, the housing 2 is equipped with a product discharger 10 for expelling the particles extracted from the processing gas. A gas-proof element is provided on the product discharger 10. Preferably, the likely means used here include flap valves, flaps, rotary feeders or a firmly docked vessel. Ideally, the product discharger 10 is simultaneously configured as a modification opening, through which the plant installer can replace the immersion-tube end piece 11 (to be described immediately hereafter) of the immersion tube 3 for another such immersion-tube end piece. For this purpose the narrow diameter of the product discharger 10 is preferably of such dimensions that through it the immersion-tube end piece 11 can be released, removed and a new immersion-tube end piece 11 can be inserted, positioned and secured to the immersion tube 3.

The immersion tube 3 can extend above the housing 2, on its upper side, as FIG. 1 shows.

At least the greater part of the immersion tube 3, however, should preferably be situated inside the housing 2. The immersion tube is preferably arranged in such a way that its tube's longitudinal axis L runs vertically.

As can be seen clearly from FIG. 1 or FIG. 3, the housing 2 and the immersion tube 3 are configured and constructed to interlock with one another in such a way that the ring-like space between the housing and the immersion tube directly behind the preferably tangential processing gas inlet forms a cyclone area, which can also be designated as the first separation zone 13. The configuration is selected in such a way that here a pre-cleaning takes place, with a degree of effectiveness, depending on product, grain size, density and temperature, of more than 90%.

Joined thereto for streaming, the ring-like space widens between the housing 2 and the immersion tube 3. It thereby forms a slowdown zone 14 connecting to the cyclone area or the first separation zone 13. The slowdown zone is configured in such a way that it reduces speed to such an extent that the particles expelled to the outside in the cyclone area can fall directly downward into the product discharger.

As can likewise be clearly recognized by reference to FIG. 1, the immersion tube 3 comprises—preferably on its lower front end—a front entry opening 20 open on the lower side, which functions as processing gas entry into the immersion tube.

For the stream to go from the slowdown zone into the processing gas inlet and then to rise in the immersion tube, it must "bend" inward "sharply" into the interior of the immersion tube, as a rule by more than 150°, ideally by almost 180°.

The slowdown zone has a synergistic effect to this extent, because the resulting speed reduction makes it possible for the processing gas flow to make a particularly sharp turn through the open front end of the immersion tube and into it.

This "turning" occurs on path whose curvature radius is decisively smaller than the curvature radius of the paths in the cyclone. The "turning" overwhelms a good portion of the smaller particles still remaining until now in the stream. Due to inertia, they continue the motion previously forced upon them for a moment longer than the gas stream and therefore they too now fall into the product discharger 10.

In the area where the stream curves into the interior of the immersion tube, a second separation zone 15 therefore takes shape, which differs in its separation principle or its deflection structure from that of the first separation zone 13, and therefore causes other-sized particles to be separated, namely those that have evaded the cyclone. It is true that in this second separation zone, in absolute quantitative terms, only far fewer particles are separated out than in the first separation zone; nevertheless, the second separation zone makes a decidedly positive contribution, because here considerably finer particles are excluded than before in the first separation area—that is, particles that otherwise would clog a particle filter with particular speed. With a corresponding configuration of the second separation zone, it is possible to exclude between 75% and 90% of those particles still borne by the processing gas after it leaves the first separation zone. This appreciably reduces the burdening of the mounted filter.

As already mentioned, preferably the immersion tube, in the area where it forms the second separation zone, is configured in two or more parts and comprises a removable immersion-tube end piece 11. As a rule, the separator is made up of various immersion-tube end pieces, which form front entry openings with various slight diameters and/or comprise various lengths in the direction of the immersion tube longitudinal axis L and thereby influence separation behavior. It should be mentioned here that the precise location of the second separation zone and its distance from the first separation zone can be established, by means of the respective length of the immersion-tube end piece, in such a way that the second separation zone can have the most effective impact possible, depending on the concrete parameters.

As can be seen from FIG. 1, the immersion tube 3 divides into a first branch 4 and a second branch 5. Thus it forms two separately streamed pathways. The first branch ends in the processing gas outlet 6. This processing gas outlet 6 here penetrates the housing 2 in the radial direction and ends preferably with a flange or tube connection outside the housing 2. Through this processing gas outlet 6, part or the major part of the processing gas, freed at least from most of its particle content, is conveyed back to the work machine or mill and recycled into it.

The second branch 5 of the immersion tube 3 ends in the secondary outlet 7, which most often ends likewise in a flange.

A filter 8, preferably positioned completely within the second branch 5, is mounted upstream of the secondary outlet 7 in flow sequence. The filter 8 constitutes a third separation zone 16, preferably situated above the second separation zone, and preferably, at least essentially, at the same height as the first separation zone.

A smaller portion of the processing gas is diverted through the secondary outlet 7 and eventually is discarded. For this purpose, the secondary outlet 7 ends outside the immersion tube 3 with a flange or tube connection. A suction pump 22, which will be described in more detail hereinafter, can be flange-mounted at this point. It is connected to serve the separator 1 and therefore constitutes, in some cases, a functional component of it.

At its upper end, the immersion tube 3 can end, or be equipped with a dust removal device 12 for the filter 8. In the simplest case, the dust removal device for the filter 8 is a simple, primarily electrically remote-actuated open-and-close valve. It controls a compressed-air connection. It enables the insufflation of compressed air against the direction of the filter. In more demanding cases, a valve is employed that enables a so-called knocking, that is, the impacting of the filter 8 with pressure surges in rapid succession. Alternatively, a mechanical knocking or vibrating apparatus, not illustrated, can also be provided here.

The ring-like gap between the outer sheath surface of the filter 8 and the interior sheath surface of the immersion tube 3 should preferably be configured so that particles retained by the filter 8, at least agglomerated in clumps, can fall downward, preferably in a straight line as far as the product discharger 10—provided no accompanying withdrawal occurs through the first branch 4 and its processing gas outlet 6. It is essential that the particles already separated by the filter should be kept from being swept in and collected inside the aforementioned ring-like gap.

To compensate for the internal pressure losses of the separator, an injector, a vacuum pump or a radial bellows (not illustrated) can be mounted on it downstream and then becomes a functional component of the separator.

Thereafter, with reference again to FIG. 3, the gas and/or particle flow can be visualized.

The arrow P1 symbolizes the entering processing gas with its particle content.

The arrow P2 symbolizes the cyclone stream. On the other hand, the arrows P3 indicate how the stream in the slowdown zone is modified. As a result, the particles separated by cycloning now fall directly away, as indicated by arrows P4.

The arrows P5 are relatively inconspicuous but important, showing how the stream is sharply diverted to the baffle, which is realized here by the immersion tube 3 or its immersion-tube end piece 11, so that an additional separation follows.

The arrow P6 symbolizes the processing gas issuing out through the processing gas outlet and fed back into the mill. The arrows of the P7 type symbolize the secondary stream, which flows by way of the second branch in the direction of the filter 8. The arrows P8 symbolize the stream flowing away through the filter sheath into the filter interior, which is diverted and discarded as a secondary stream along the arrow P9.

The arrows of type P10 symbolize the compressed air insufflated in some cases by the dust removal device in the opposite direction, serving for filter cleaning. The arrow P11 symbolizes how particles thereby blown off the filter fall into the product discharger 10.

What is claimed is:

1. A separator for separating solid particles from a processing gas stream that has been fed repeatedly through a work machine, the separator comprising:
a processing gas inlet through which particle-laden processing gas emitted from the work machine is fed into the separator,
a filterless separator element to reduce a particle content of the processing gas, and
a processing gas outlet to discharge a portion of the processing gas with the reduced particle content to the work machine,
wherein the separator includes a secondary stream filter and a secondary outlet downstream from the secondary stream filter, the secondary stream filter filtering another portion of the processing gas with the reduced particle content to provide a filtered secondary stream, and the secondary outlet ejecting the filtered secondary stream of the processing gas,
wherein the separator element comprises a cyclone separator and a baffle connected to the cyclone separator downstream from said cyclone separator,
wherein a tube with a front-end inlet opening is provided as the baffle, said tube being positioned as an immersion tube in an area of an eye of a cyclone stream, and
wherein the immersion tube passes through the cyclone stream.

2. The separator according to claim 1, wherein the filterless separator element is situated upstream from the secondary stream filter in such a way that the secondary stream filter is fed with processing gas bearing reduced particle content.

3. The separator according to claim 1, wherein a lower front end of the immersion tube comprises the front-end inlet opening,
wherein within an interior of the immersion tube, the immersion tube is configured to project a stream rising along a longitudinal axis of the immersion tube, and
wherein the separator is configured in such a way that the cyclone stream provides a falling stream between the processing gas inlet and the lower front end of the immersion tube.

4. The separator according to claim 3, wherein where the immersion tube provides the baffle, the immersion tube is configured in several parts so that the front-end inlet opening is configured from an immersion-tube end piece, which is removable from a remainder of the immersion tube, and
wherein the immersion-tube end piece is exchangeable with another immersion-tube end piece, which comprises a front-end inlet opening with a different diameter.

5. The separator according to claim 1, wherein the immersion tube branches into a first branch, which configures the processing gas outlet, and into a second branch, which forms the secondary outlet, such that an end of the first branch is situated below an end of the second branch.

6. The separator according to claim 5, wherein the immersion tube contains in the second branch the secondary stream filter upstream from the secondary outlet, and wherein the secondary stream filter is configured as a filter tube, with a vertically directed tube longitudinal axis, of which a coating surface is penetrated by the secondary stream from outside to inside.

7. The separator according to claim 6, wherein the secondary stream is fed to the secondary stream filter through a gap between the immersion tube and the filter tube.

8. The separator according to claim 1, wherein the separator is equipped with a suction pump, which applies a low pressure to the secondary outlet or the second branch.

9. The separator according to claim 8, wherein the separator is equipped with the suction pump behind the secondary outlet.

10. The separator according to claim 1, wherein the separator comprises a dust-removal or flushing device configured to flush the filter in a direction counter to a filtering direction.

11. The separator according to claim 10, wherein the filter is flushed by pressure surges.

12. The separator according to claim 1, wherein the immersion tube contains the secondary stream filter for the secondary outlet.

13. The separator according to claim 1, wherein the secondary stream filter mounted upstream from the secondary outlet is positioned in such a way that particles removed by the secondary stream filter are evacuated during flushing through the immersion tube downward into a particle discharge area.

14. The separator according to claim 1, wherein a cyclone sheath tube widens above the baffle and narrows again at the level of the baffle.

15. A system comprising:
a mill or crushing machine, and
a separator connected by tubing to the mill or crushing machine, the separator being configured to remove dust from a processing gas in the mill or crushing machine, wherein the separator includes:
a processing gas inlet through which particle-laden processing gas emitted from the mill or crushing machine is fed into the separator,
a filterless separator element to reduce a particle content of the processing gas, and
a processing gas outlet to discharge a portion of the processing gas with the reduced particle content to the mill or crushing machine,
wherein the separator includes a secondary stream filter and a secondary outlet downstream from the secondary stream filter, the secondary stream filter filtering another portion of the processing gas with the reduced particle content to provide a filtered secondary stream, and the secondary outlet ejecting the filtered secondary stream of the processing gas,
wherein the separator element comprises a cyclone separator and a baffle connected to the cyclone separator downstream from said cyclone separator,
wherein a tube with a front-end inlet opening is provided as the baffle, said tube being positioned as an immersion tube in an area of an eye of a cyclone stream, and
wherein the immersion tube passes through the cyclone stream.

16. A method for separating solid particles from a processing gas stream, which issues from a work machine, the method comprising:
feeding particle-laden processing gas from the work machine to a separator via a processing gas inlet,
subjecting the processing gas to a filterless separator element of said separator to reduce a particle content of the processing gas,
dividing the processing gas with the reduced particle content into a first part and a second part,
discharging the first part via a processing gas outlet of said separator and feeding back the first part, unfiltered, to the work machine, and filtering the second part via a secondary stream filter of said separator to provide a filtered secondary stream and then discarding the filtered secondary stream via a secondary outlet, wherein the secondary outlet is downstream from the secondary stream filter, wherein the separator element comprises a cyclone separator and a baffle connected to the cyclone separator downstream from said cyclone separator, wherein a tube with a front-end inlet opening is provided as the baffle, said tube being positioned as an immersion tube in an area of an eye of a cyclone stream, and wherein the immersion tube passes through the cyclone stream.

\* \* \* \* \*